O. L. BOWERS.
BALING PRESS.
APPLICATION FILED JULY 22, 1918.
1,369,612.   Patented Feb. 22, 1921.
8 SHEETS—SHEET 1.
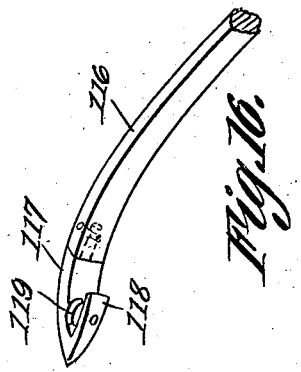
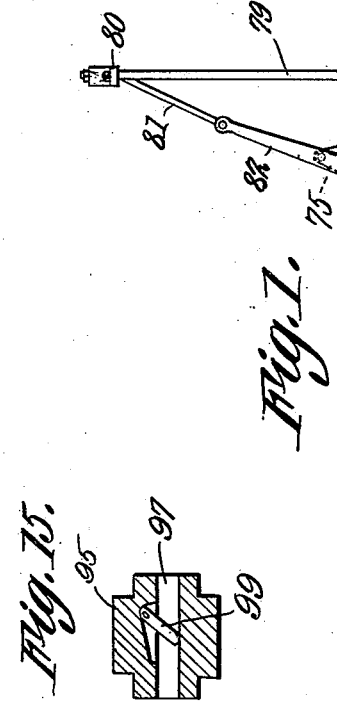
Inventor
O. L. Bowers
By C. A. Snow & Co.
Attorneys
Witness

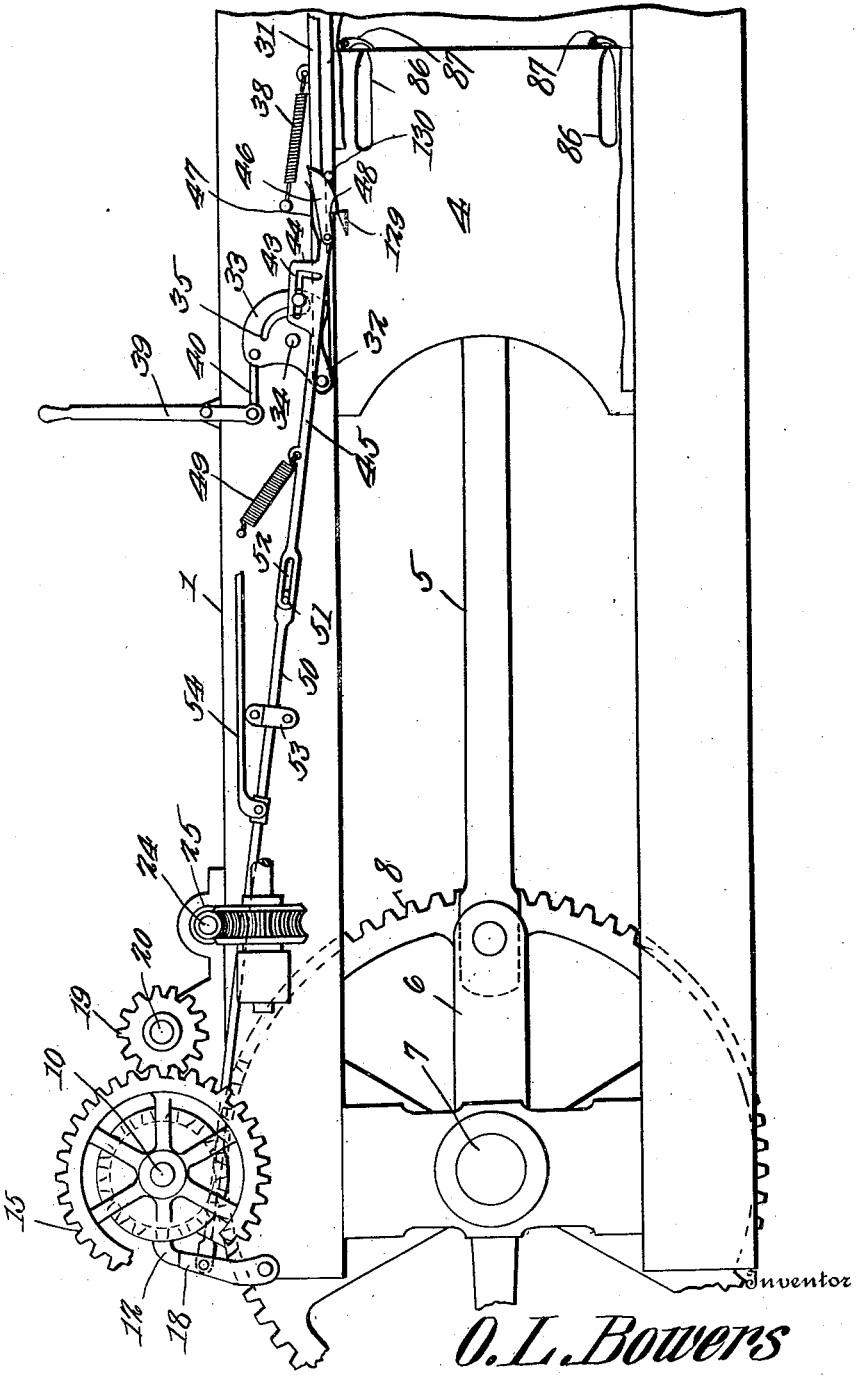

O. L. BOWERS.
BALING PRESS.
APPLICATION FILED JULY 22, 1918.
1,369,612.
Patented Feb. 22, 1921.
8 SHEETS—SHEET 3.
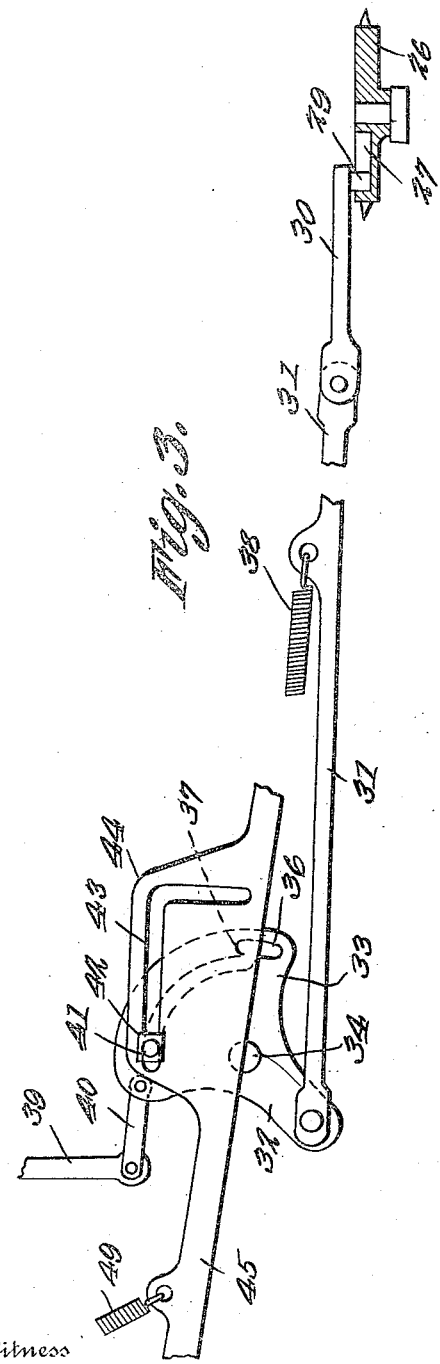
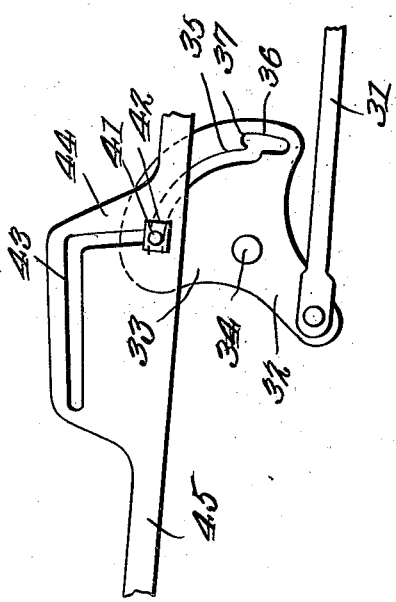
Inventor
O. L. Bowers
Attorneys O. L. BOWERS.
BALING PRESS.
APPLICATION FILED JULY 22, 1918.
1,369,612.
Patented Feb. 22, 1921.
8 SHEETS—SHEET 4.
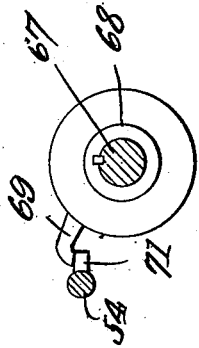
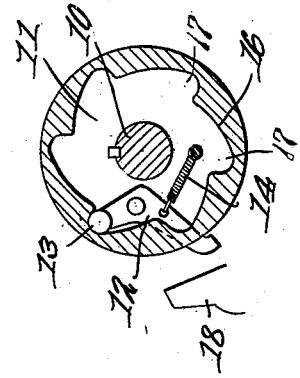
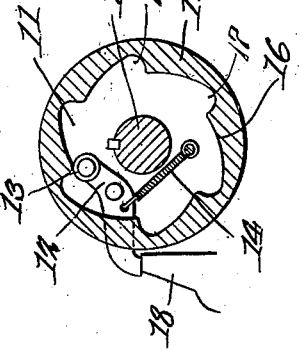
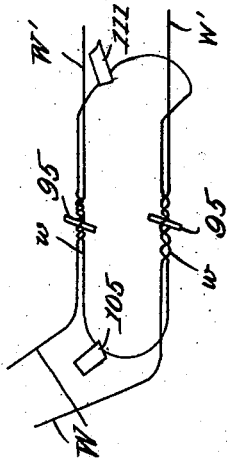
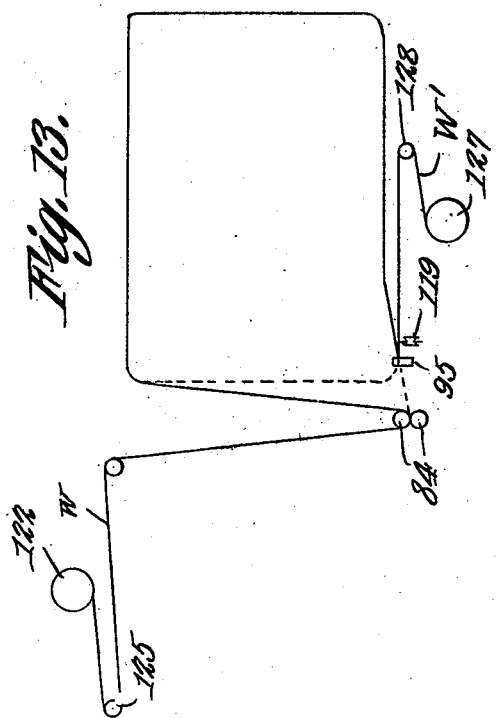
Witness
Inventor
O. L. Bowers
By C. A. Snow & Co.
Attorneys

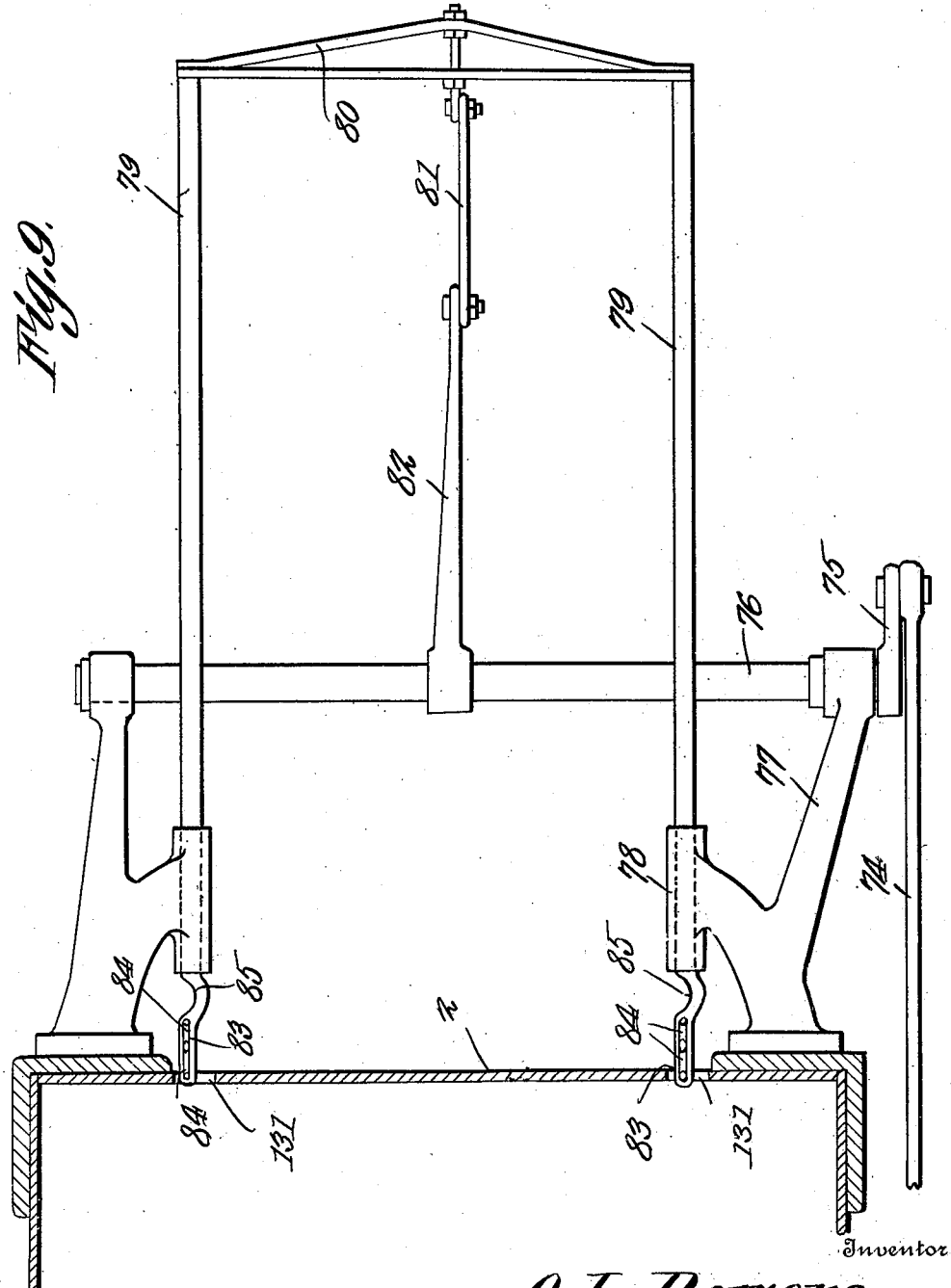

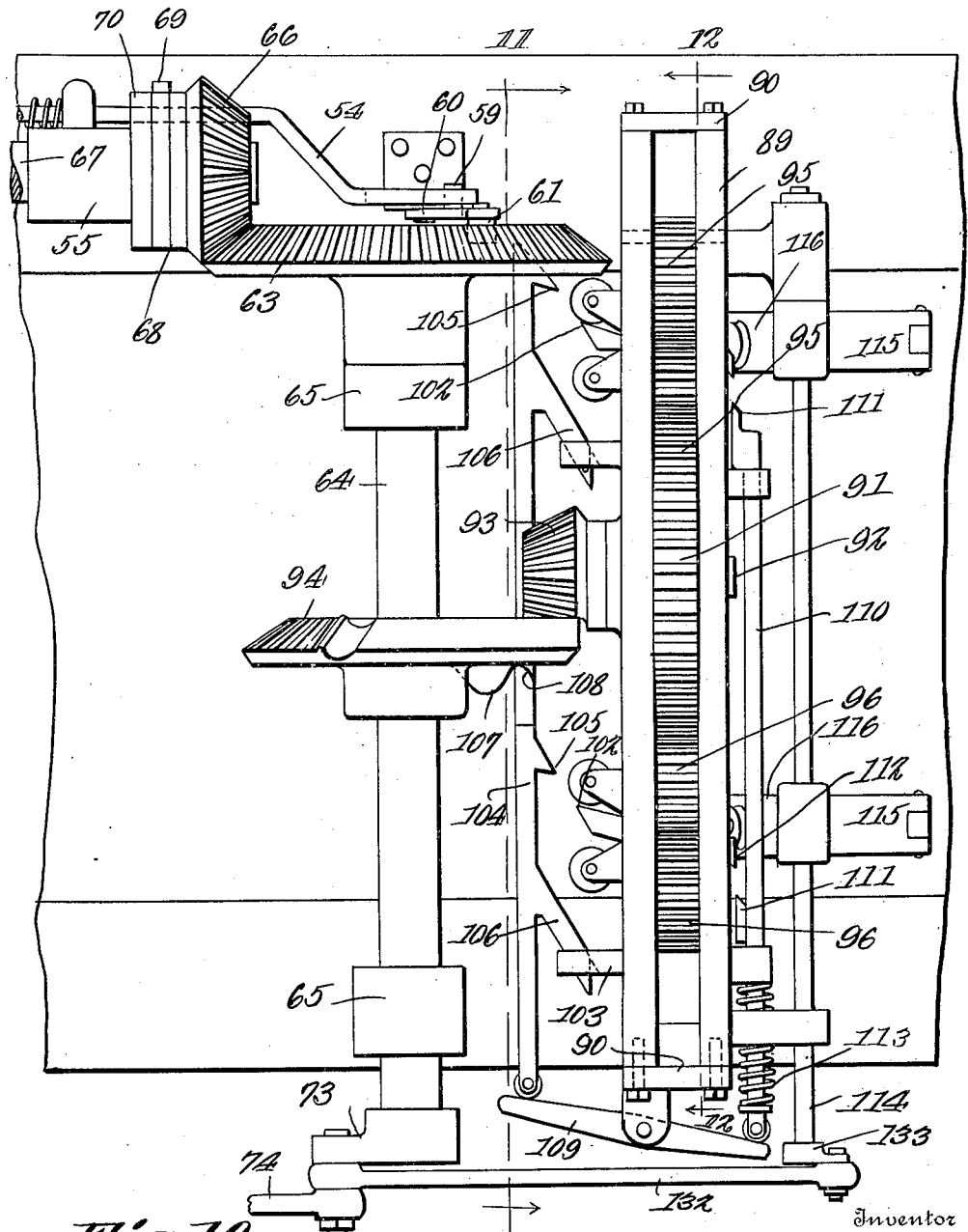

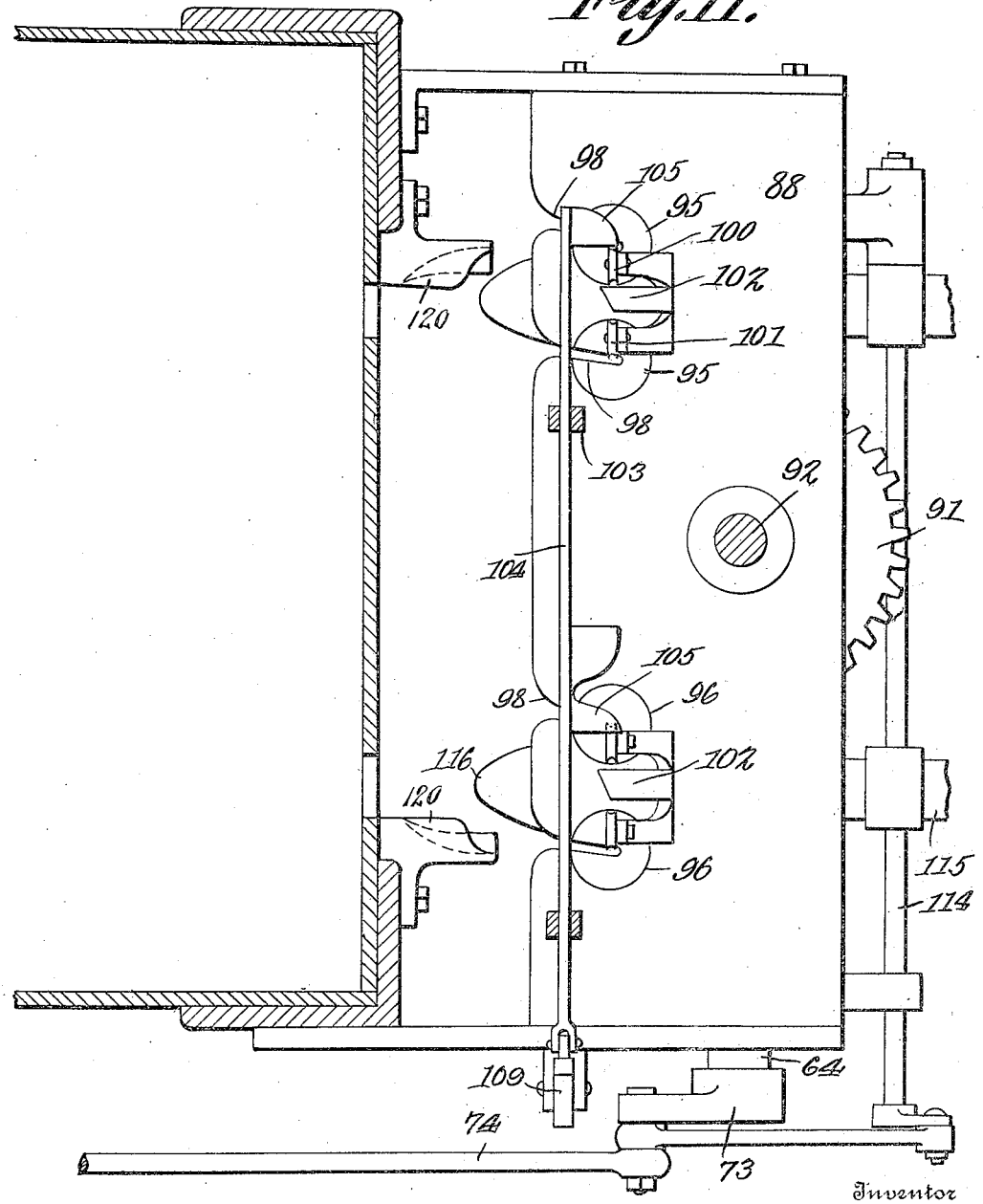

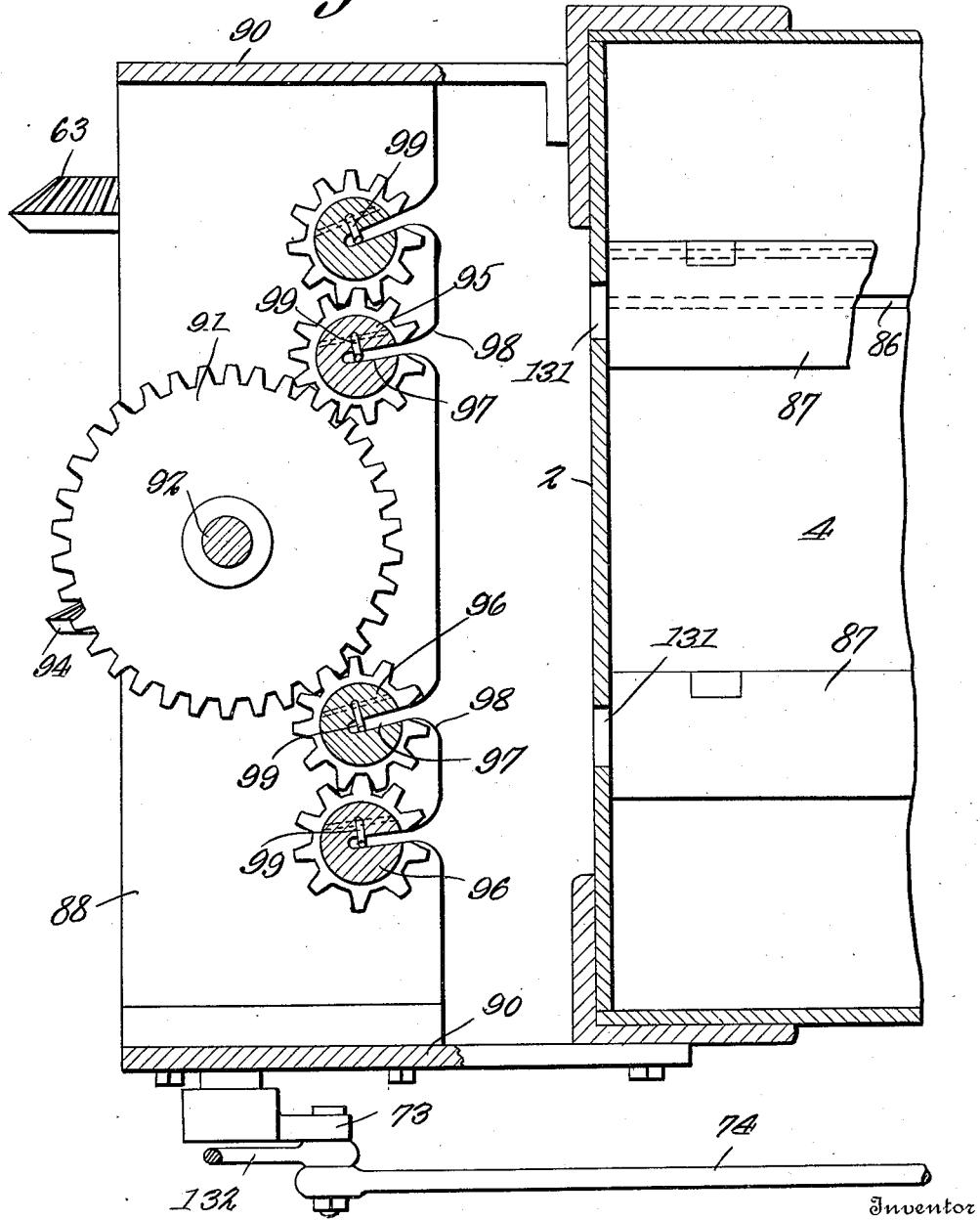

UNITED STATES PATENT OFFICE.

OSCAR L. BOWERS, OF OLIVE BRANCH, ILLINOIS, ASSIGNOR OF ONE-HALF TO ASA J. WILBOURN, OF OLIVE BRANCH, ILLINOIS.

BALING-PRESS.

1,369,612.  Specification of Letters Patent.  Patented Feb. 22, 1921.

Application filed July 22, 1918. Serial No. 246,167.

*To all whom it may concern:*

Be it known that I, OSCAR L. BOWERS, a citizen of the United States, residing at Olive Branch, in the county of Alexander and State of Illinois, have invented a new and useful Baling-Press, of which the following is a specification.

This invention relates to baling presses, one of its objects being to provide simple and efficient means whereby the bale, when brought to the desired proportions within the press box, will be held under compression by tie wires which are automatically positioned around the bale and fastened together.

Another object is to provide simple and compact mechanism for twisting and cutting the baling wires when the baling operation is completed.

A still further object is to provide means for holding the compressing follower or plunger stationary during the tying operation, the connection and disconnection of the follower relative to the plunger being automatic.

A further object is to provide novel means for operating the needles of the tying mechanism in properly timed relation with the balance of the mechanism.

With the foregoing and other objects in view which will appear as the description proceeds the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a plan view of the mechanism constituting the present invention, one end portion of the press box being broken away.

Fig. 2 is a side elevation of the plunger controlling mechanism and adjacent parts.

Fig. 3 is a side elevation of the bale operated pull bar and parts associated therewith.

Fig. 4 is a side elevation of a portion of the structure shown in Fig. 3 and showing the parts in another position.

Fig. 5 is a plan view of the bale engaging wheel of said mechanism.

Fig. 6 is a section through the plunger controlling clutch in disengaged position.

Fig. 7 is a view similar to Fig. 6 and showing the parts of the clutch engaged.

Fig. 8 is a detail view of the clutch of the needle and twister operating mechanism.

Fig. 9 is a front elevation of the needles and adjacent parts.

Fig. 10 is an enlarged side elevation of the tie twisting and cutting mechanism and the parts associated therewith.

Fig. 11 is a section on line 11—11, Fig. 10, the vertical shaft and its gears being removed.

Fig. 12 is a section on line 12—12, Fig. 10.

Fig. 13 is a view showing, in diagram, the arrangement of the tie during the tying operation.

Fig. 14 is a view showing, in diagram, how two ties are twisted together and severed to form separate strands.

Fig. 15 is a longitudinal section through one of the twisting gears.

Fig. 16 is a detail view of one of the threading fingers.

Referring to the figures by characters of reference, 1 designates the frame of the baling press extending from one end of a press box 2, there being a hopper 3 or the like for supplying material to the press box and into the path of a follower or plunger 4 mounted for reciprocation. A pitman 5 connects this follower to a crank 6 carried by a shaft 7 to one end of which is secured a gear 8. A gear 9 meshes with the gear 8 and is secured to a transverse shaft 10 to one end of which is secured a disk 11. A lever 12 is pivotally mounted on one face of this disk and carries a roller 13 at its inner end while a spring 14, which is connected at one end to the lever and at its other end to the disk, serves to hold the other or outer end of the lever normally drawn inwardly toward the periphery of the disk. A gear 15 is loosely mounted on the shaft 10 and is provided on its inner face with a flange 16 which extends toward the disk 11 and lever 12, forming a recess into which the roller 13 projects. The inner surface of the flange 16 forming the wall of the recess is provided with recesses 17 so shaped that when the roller 13 is seated in one of them and the gear 15 is rotated in one direction, the wall of the recess will press against the roller and thrust, through lever 12, against the disk 11, thus to drive the shaft 10. A release dog 18 is pivotally mounted on the frame 1 near the gear 15 and is adapted, when swung out of normal position, to move into the path of the projecting end of lever 12 and shift the lever, thus to uncouple the gear 15 from the disk 11 and shaft 10. See Fig. 6.

The gear 15 is constantly rotated by a gear 19 secured to the main drive shaft 20 having a belt driven pulley 21 or any other suitable means for operating it. A gear 22 is secured to shaft 20 and meshes with a gear 23 secured to a transverse shaft 24 journaled on the frame 1 and having a worm 25 at one end.

Projecting into one side of the press box so as to be actuated by the compressed material forming the bale therein, is a toothed wheel 26 having a segmental recess 27 one end of which is formed with an extension or notch 28. A lug 29 projects into this recess and extends from one end of an arm 30 pivotally connected to a pull bar 31 which, in turn, is pivotally connected to an arm 32 extending downwardly from a pivoted segment 33 fulcrumed, as at 34, upon the side of the frame 1 and having a concentric slot near the periphery thereof, as shown at 35. The lower end of the slot is offset as at 36 to form a shoulder 37. A spring 38 connects the pull bar 31 to the frame 1 and exerts a constant pull on the bar so as to hold the parts 30, 31 and 32 normally in the positions shown in Figs. 3 and 4. A hand lever 39 may be connected to the upper portion of the segment 33 by a link 40, as shown.

A stud 41 projects loosely into the slot 35 and extends from a block 42 slidably mounted in an L-shaped slot 43 formed in a plate 44 extending from a controlling rod 45. A dog 46 is pivotally connected to the rod 45 at one end and has a spring 47 for pressing it downwardly yieldingly, said dog being provided with a beveled end, as shown, and with a shoulder 48. A spring 49 connects the rod 45 with the frame 1 and serves normally to pull the rod upwardly and backwardly away from the wheel 26. A connecting rod 50 is pivotally attached at one end to the dog 18 and has a stud 51 on its other end which is slidably engaged by one end of the controlling rod 45, there being a slot 52 in the rod 45 into which the stud 51 projects. A guide 53 may be provided for the rod 50.

Pivotally connected to the connecting rod 50 is a restraining rod 54 slidable with a bearing 55 and having a collar 56. A coiled spring 57 is mounted on this rod and bears at one end against the collar and at its other end against the bearing 55, thus to hold the rod 54 normally pressed in one direction.

A slot 58 is formed in one end portion of the rod 54 and projecting loosely thereinto is a stud 59 extending from a lever 60. Another stud 61 projects from this lever and into a cam slot 62 formed in the upper face of a beveled gear 63. The greater portion of the cam slot is concentric with the gear but a short length thereof is extended inwardly toward the center of the gear, as shown at 62'. Gear 63 is secured to a vertical shaft 64 journaled in bearings at one side of the press box 2, as shown at 65. A beveled gear 66 meshes with gear 63 and is mounted on one end of a shaft 67, there being a clutch connection between this gear and its shaft 67 and which connection, shown at 68, is of the same construction as the clutch shown at Figs. 6 and 7. In other words a lever 69 is connected to the gear 66 and adapted to engage a recessed disk 70 secured to the shaft 67 so that motion is thus transmitted from the shaft and through the disk and lever to the gear 66. However, when the lever is tripped, the disk will be disconnected from the gear and will rotate independently thereof. An ear 71 extends from the restraining rod 54 and is normally underneath the lever 69. When the rod is shoved longitudinally, as hereinafter described, however, the ear will be brought from the path of lever 69 and free it so as to couple the gear 66 to its shaft 67. Shaft 67 receives its motion from the worm 25 through a worm wheel 72.

Extending from the lower end of the vertical shaft 64 is a crank arm 73 connected, by a rod 74, to another crank arm 75 secured to the lower end of a vertical shaft 76 at the other side of the press box, it being understood that the rod 74 extends under the press box. Shaft 76 is journaled in upper and lower bearings 77 each of which has a guide sleeve 78. Upper and lower needles 79 are slidably mounted in these sleeves and are fixedly attached to a head 80 at one end thereof. This head, in turn, is connected by a link 81 to a crank arm 82 extending from the shaft 76. See Fig. 9. Each needle has a slot in the end portion thereof, as shown at 83, there being a pair of grooved rollers in each slot, and which have been indicated at 84. The needles 79 are provided with depressions 85 close to and back of the slots 83. The two needles are so located that when the plunger or follower 4 is in its advanced position, they will aline with corresponding grooves 86 formed in the advancing or front face of the follower and will move transversely of the press and longitudinally along the grooves. As shown in Fig. 2, these grooves may be provided with hinged guard strips 87 for closing the fronts thereof and preventing straw, etc., from packing back into the groove while the material is being compressed.

A frame made up of parallel plates 88 and 89 connected at top and bottom by plates 90, is arranged close to and parallel with the shaft 64, the plates 88 and 89 occupying vertical planes extending at right angles to the sides of the press box. A gear 91 is journaled between the middle portions of these plates, it having a short shaft 92 provided at one end with a mutilated beveled gear 93 meshing with a mutilated gear 94 on the shaft 64. Located in the frame 88, 89, 90, above the gear 91 is a pair of twisting gears 95 meshing with each other and the lower one of which meshes with the gear 91. Another pair of twisting gears 96 is located below the gear 91, they being in mesh with each other and the upper gear of the pair meshing with gear 91. All of the twisting gears have radial wire receiving slots 97 extending thereinto and which normally aline with wire receiving slots 98 which extend into the plates 88 and 89 from the inner edges thereof. A retaining pin 99 is pivotally mounted in each gear 95 and 96 and is adapted to gravitate to position across the inner portion of the slot in the gear, as shown in Fig. 15.

Brackets 100 extend from the plate 88 between the slots 98 of each pair and grooved wheels 101 are mounted on these brackets. A stationary cutting blade 102 is located between each pair of wheels 101. Guide brackets 103 extend from the plate 88 and a rod 104 is slidably mounted therein and carries cutting blades 105 adapted to coöperate with the blades 102 to sever wires, as hereinafter described. This rod has inclined tongues 106 which engage the brackets 103 so that, when the rod is thrust downwardly, it will be moved inwardly toward the plate 88 and shear off the wires upon the beveled ends of the fixed blades or cutters 102. See Fig. 10. A cam 107 is provided on the gear 94 for engaging the rod 104 and thrusting it downwardly at the proper time during the operation of the apparatus, there being a shoulder 108 on the rod for engagement by the cam.

The lower end of the rod 104 bears against one end of a lever 109 and the other end of the lever is adapted to thrust upwardly against a rod 110 carrying cutters 111 adapted to coöperate with fixed cutters 112. These fixed cutters are located between slots 98 in plate 89, and a spring 113 on the rod 110, serves to press said rod downwardly and to hold the rod 104 elevated so as to hold the movable cutters on the two rods spaced from their fixed cutters.

A shaft 114 is journaled close to and parallel with the rod 110 and has radial arms 115 to which are pivotally connected feeding fingers 116. Each finger has a head 117 swiveled thereon, the free end of the head being pointed and provided with a backwardly inclined guard 118. A grooved wheel 119 is arranged between the finger and its guard and is normally in a vertical plane. A stationary cam is located in the path of each finger, as shown at 120 and is so shaped that, when the finger swings horizontally into position between the side of the pressbox 2 and the plates 88 and 89 the head 117 of the finger will be given a one-quarter turn so as to bring the wheel of the finger into a horizontal position with the guard 118 lowermost. While thus positioned the finger head 117 and the wheel 119 will pass over the depressed portion 85 of a needle 79 as hereinafter described and engage a wire strand carried by the needle.

Secured to one side of the frame 1 between the hopper 3 and the drive mechanism is a bracket 121 carrying a spool 122 on which the tie wire W is wound. A slide 123 is mounted on the bracket 121 and is pulled in one direction by an adjustable spring 124. A grooved wheel 125 is carried by the slide and engages the wire W between the spool 122 and the needle 79, thus to hold the wire under tension. Another bracket 126 supports a spool 127 on the side of the press box 2 between the fingers 116 and wheel 26 and a spring drawn tension wheel 128 is movably mounted on the bracket for engaging a wire W' extending from the spool 127.

The follower 4 is provided on one side, with a tooth or projection 129 adapted to be engaged by the dog 46 and a lifting pin 130 is extended laterally from the press box and into the path of the beveled end of the dog for elevating the dog out of engagement with the tooth 129.

In using the machine the material to be baled is supplied to the press box through the hopper 3, the follower 4 operating to force this material forwardly into the press box in the usual manner. Under ordinary conditions the follower is reciprocated uninterruptedly by the shaft 7 driven through the gears 19, 15, 9 and 8. Shaft 67 is continuously driven by the worm gearing 25 and 72 but, as the ear 71 is normally positioned under or in the path of the lever 69, gear 66 is normally uncoupled from the shaft 67 and will not be driven thereby. Wire W is extended from its tension device and between the wheels of the needle 79 and thence across the machine through openings 131 in the walls thereof, said wire being secured to the wire W' extending between the wall of the press box and the plates 88 and 89. As the material is pressed into the press box by the follower it will push against that portion of the wire extending across the press box and will force it ahead of the material so that the wire will thus lie along three sides of the bale being formed. During this movement of the material it will engage and rotate the wheel 26. During the first half of the rotation of the wheel the recessed portion 27 thereof will allow the arm 30 to remain stationary but during the completion of the rotation of the wheel the stud 29 will become seated in the notch 28 and will be pulled by the wall thereof so as to cause the arm 30 gradually to pull on the bar 31 against the action of spring 38. This will cause the segment 33 to swing upwardly from the position shown in Fig. 3 until the shoulder 37 is brought into engagement with the stud 41. Immediately thereafter the stud 29 will be pulled out of the notch 28 by spring 38 and snapped back to its initial position, passing straight across the recess 27. This sudden movement due to the action of the spring 38 will return the rod 31 and the segment 33 to their normal positions and cause the shoulder 37 in the segment to pull upon the stud 41 and swing the controlling rod 45 downwardly, thereby to bring the dog 46 in to the path of the tooth 129 on the reciprocating follower. Consequently during the next forward stroke of the follower, the tooth 129 will pull the dog 46, and rod 45 and cause said rod to pull through the rod 50 upon the dog 18 which will thus be drawn into the path of lever 12 and disconnect the shaft 7 from its driving mechanism. This action takes place when the crank 6 arrives at the dead center, thus to hold the follower in its advanced or compressing position. Just as the follower reaches such advanced position the beveled face of the dog 46 is brought against the pin 130 and lifted out of engagement with the tooth 129 so that the spring 49 can return the rod 45 and dog 46 to their normal positions. Rod 45 is permitted thus to slide back independently of the rod 54 because of the slot 52.

When rod 50 is actuated by the follower in the manner described it thrusts through rod 54 against the action of spring 57 and shifts the ear 71 from engagement with the end of lever 69, the slotted end 58 of the rod at the same time sliding on the lever stud 59. As soon as the ear 71 is thus moved the gear 66 is coupled to the shaft 67 and, as said shaft is constantly rotating, the gear will thus be rotated and will cause gear 63 to rotate therewith in the direction of the arrow in Fig. 1. Thus stud 61 on lever 60 will be forced out of the inwardly extending portion 62' of the cam groove 62 and will enter the concentric portion of said groove with the result that the stud 59 will press against the end wall of the slot 58 and hold the rod 50 against return movement until after the gear 63 has completed one revolution when the stud 61 will reënter the portion 62' of groove 62 and allow the spring 57 to return the ear 71 into the path of lever 69 and uncouple the gear 66 from shaft 67.

The rotation of shaft 64 with gear 63 and which of course takes place while the follower 4 is at rest causes the actuation of four separate mechanisms, to wit, the needle mechanism, the threading mechanism, the twisting or tying mechanism, and the wire cutting mechanism. During the first half of the rotation of the shaft 64 the crank 73 transmits motion through rod 74 to crank 75 which causes the shaft 76 to rotate and swing arm 82. This will pull through link 81 on the head 80 and cause the needles 79 to slide across the press box, passing into the grooves 86 in the front end of the follower, the depressions 85 of the needles being brought under the paths of the respective threading fingers 116. During the second half of the rotation of shaft 64 the needles will be returned to their initial positions. During the first half of the movement of each needle it will bring a loop of its wire W across the press box and within the groove 86. Meanwhile the crank 73 has been transmitting motion through a rod 132 to a crank 133 on the lower end of the shaft 114 and the arms 115 swing the fingers 116 over the needles. During the movement of the fingers the heads 117 thereof are given a one quarter turn so that the wheels 119 are brought to horizontal positions and, when the fingers 116 begin their return movement, they will pass over the depressed portions of the needles and the wheels 119 will engage the respective tie wires W, drawing them between the plates 88 and 89 and the side of the press box and to position back of the plate 89. During this return movement of the fingers 116, which occurs while the needles are being reset, the heads 117 of the fingers turn back to their original positions with the wheels vertical, so that the two strands of each wire loop engaged by a wheel 119 will be drawn laterally into the adjacent pairs of slots 98 and slots 97. The drawing of the strands of wire into the slots in this manner will cause them to press against and lift the pins 99 which will subsequently gravitate back to position and hold the strands in the slots. As the wire W' extends from the spool 127 through the slot 97 in the upper gear 95 or 96 and is looped back through the slot 97 in the lower gear of the pair and then extends partly around the bale being formed and is connected to the wire W, it will be apparent that when the wire W is threaded into the slots 97 in the same gears in which wire W' is seated said wires will form opposed loops through the gears as shown in Fig. 14.

During the completion of the threading operation described, the mutilated gears 93 and 94 are brought into mesh producing a quick and short movement of the large gear 91 which, in turn, rotates the gears 95 and 96, thereby twisting the wires W and W' together at the sides of their loops, as shown at w in Fig. 14. The final movement of the shaft 64 will be sufficient to cause cam 107 to depress rod 104, thus to actuate lever 109 and rod 110, thereby to cause the various cutters to sever the wire loops between the twists, leaving one strand of wire fastened about the completed bale and another strand extending from the spool 127 through one of the gears 95 or 96 and thence across the press box in the path of material to be packed or baled, the bending of the strand under the pressure of the material thereagainst, pressing it back into the slot in the other gear 95 or 96 thus to form a loop as in Fig. 14 to be connected to the strand W in the manner heretofore described.

As soon as the shaft 64 completes one revolution, the lever 60 which has been holding the rod 54 against return movement, will be released and the rod 54 will thus move to uncouple the gear 66 as hereinbefore described. It will also thrust back on the dog 18 and recouple shaft 7 to its drive mechanism so that the follower 4, which had been at rest during the tying operation, can resume its movement to form a new bale.

It is to be understood that a separate set of spools with wire strands W and W' is to be provided for each needle 79.

The lever 39 is provided for use when vines, and the like are being baled. Wheel 26 is disconnected and the plunger 4 is permitted to make several strokes after the feeding of material to the hopper 3 has stopped. This will cause the long ends to be gathered up and compressed and by then shifting the lever 39 the parts can be actuated to uncouple the plunger from its driving mechanism whereupon the balance of the mechanism will operate as hereinbefore described.

What is claimed is:—

1. In a baling press a plunger, mechanism for reciprocating the same including a shaft and a gear on the shaft, a notched member revoluble with the shaft, a lever on the gear and normally engaging the notched member to couple the gear to the shaft, a dog, a wheel adapted to be rotated by the material being compressed by the plunger, means actuated by said wheel for moving said dog into position to be engaged and actuated by the plunger, and means actuated by the plunger operated means for shifting the dog into engagement with the lever to uncouple the gear from its shaft and stop the plunger.

2. In a baling press a plunger, driving mechanism therefor including a clutch, a dog, a wheel adapted to be rotated by the material being compressed by the plunger, a pivoted device movable by said wheel into position to be engaged and shifted by the plunger, a connection between said device and the dog for shifting the dog to disconnect the clutch, and means for automatically disconnecting the pivoted device from the plunger immediately subsequent to its engagement therewith.

3. In a baling press a plunger, driving mechanism therefor including a clutch, a wheel adapted to be rotated by material being compressed by the plunger, said wheel having a segmental recess, a pull bar, means extending therefrom and engaging a wall of the recess for shifting the bar during a portion of the movement of the wheel, means for abruptly returning the bar to its initial position when the recess in the wheel is brought to a predetermined position during the rotation of the wheel, a controlling rod, a pivoted dog or catch thereon, and means operated by the pull bar during its actuation by the wheel, for coupling said bar to the controlling rod to actuate said rod during the return of the bar to initial position, said means operated by the said movement of the rod shifting the catch or dog into engagement with the plunger for actuation thereby to disconnect the clutch and stop the plunger.

4. The combination with a plunger mounted for reciprocation to form a bale, and spaced twisters for engaging the looped end of a wire, said wire extending partly around the bale, of means for feeding a portion of the wire between the plunger and bale, means for engaging the fed portion of the wire, forming a loop thereof, and positioning the loop within the twisters and beside and opposite to the first named loop, means for actuating the twisters to connect the corresponding sides of the opposed loops, and means for severing the ends of the loops to form an unbroken strand extending across the path of the plunger and a tie secured about the completed bale.

5. The combination with a plunger mounted for reciprocation, and means controlled by the bale being formed by the plunger, for stopping the movement of the plunger, of separate means operating in timed relation while the plunger is at rest, for successively feeding a tie between the bale and plunger, drawing opposed portions of the tie together at one side of the bale, twisting together said portions, and severing the tie between the twisted portions to form a completed tie extending around the bale and an unbroken strand extending across the path of the plunger, and means for automatically starting the reciprocation of the plunger immediately after said successive operations.

6. In a baling press the combination with a needle mounted for movement across the back of a bale being formed, of revoluble twisting devices, a threading finger, means for moving the finger back and forth across the needle when said needle is in one extreme position, a wire engaging element carried by said finger, means for rotating said element during the movement of the finger in one direction to direct opposite portions of the engaged loop of wire into engagement with the respective twisting devices.

7. In a baling press the combination with a wire feeding needle movable transversely across the back of a bale being formed, of superposed twisters mounted for rotation and having radial wire receiving slots, a threading finger, means for moving the finger back and across the needle when in one extreme position, a wheel carrying head swiveled upon the finger and adapted to engage the wire on the needle and draw a loop of wire from said needle, means for rotating the head during the movement of the finger back to its initial position to turn the loop of wire and feed opposed portions of the loop into the slots in the respective twisters.

8. In a baling press the combination with a wire feeding needle, of superposed revoluble twisters having radial wire receiving slots, a threading finger, a head swiveled thereon, a wheel carried by the head and adapted to engage the wire on the needle, means for oscillating the finger to move the wheel into engagement with the wire and draw the wire in a loop from the needle, means for rotating the head to turn the wheel and loop and feed the opposed portions of the loop into the slots in the respective twisters, retaining pins pivotally mounted in the slots in the twisters for holding the wire therein, and means for rotating the twisters.

9. In a baling press having a needle mounted for movement across the bale, revoluble twisting devices, a threading finger, means for moving the finger back and forth across the needle when the latter is in its projected extreme position across the bale, a wire engaging element movable on said finger, and means for rotating said wire engaging element during the movement of the finger to direct the opposite portions of the engaged loop into engagement with the respective twisting devices.

10. In a baling press having a needle mounted for movement across the back of a bale being formed, revoluble twisting devices, a threading finger, means for moving the finger back and forth across the needle when the latter is in one extreme position, a wire engaging element carried by said finger, and means for rotating said element during the movement of the finger in one direction to direct the opposite portions of the engaged loop of wire into engagement with the respective twisting devices.

11. In a baling press having a wire feeding needle movable transversely across a bale, superposed rotatable twister gears having radial wire receiving slots pivoted pins in the latter, a threading finger, means for moving the latter back and forth across the needle when in projected position, a hooked head swiveled upon the finger and adapted to engage the wire on the needle, means for rotating the hooked head during the retracting movement of the finger, to turn the members of the engaged loop and seat the same in said radial wire receiving slots of said twister gears.

12. In a baling press having a wire feeding needle movable transversely across the back of a bale being formed, superposed twisters mounted for rotation and having radial wire receiving slots, a threading finger, means for moving the finger back and forth across the needle when in one extreme position, a wheel carrying head swiveled upon the finger and adapted to engage the wire on the needle and means for rotating the head during the movement of the finger back to its initial position to turn the loop of wire engaged by the wheel carrying head and seat opposed portions thereof in said radial wire receiving slots of said twisters.

In testimony that I claim the foregoing as my own, I have hereto affixed my signature in the presence of two witnesses.

OSCAR L. BOWERS.

Witnesses:
P. H. FELDERS,
ALAM CLAGG.